United States Patent Office 3,226,396
Patented Dec. 28, 1965

3,226,396
PROCESS FOR PREPARING AMINOINDOLE
COMPOUNDS
Herbert E. Johnson, South Charleston, W. Va., assignor to
Union Carbide Corporation, a corporation of New York
No Drawing. Filed Dec. 4, 1962, Ser. No. 242,058
8 Claims. (Cl. 260—319)

The present invention relates to a novel process for the preparation of amino-substituted indole compounds and also discloses certain novel amino-substituted indole-3-alkanoic acids having unusual biological activity.

Aminoindole compounds have found diverse application in the pharmaceutical field and also possess activity as agricultural chemicals. A major drawback in the use of these compounds, however, has been their arduous, time-consuming mode of preparation. For example, Shaw et al. in J. Am. Chem. Soc., 75 (1953), disclose preparative techniques involving the preparation of the corresponding nitroindole compounds by the familiar Fischer synthesis followed by reduction to the amine with hydrosulfite or palladium-on-charcoal catalyst. Major difficulties inherent in these known processes include low yield production of the desired aminoindole compound and contamination thereof as a result of by-product formation.

The present process obviates or mitigates the above-mentioned difficulties by providing a simple, one-step, high-yield preparative technique for preparing aminoindole compounds from the corresponding nitroindoline compounds.

Basically, the process of this invention comprises reacting an indoline compound substituted with a nitro group in one of the ring positions of the benzenoid moiety of said indoline compound with molecular hydrogen in the contacting presence of a nickel-containing metal catalyst and in a non-acidic reaction medium.

When proceeding in accordance with this invention, there is achieved simultaneous hydrogenation of the said nitro group to an amino group and dehydrogenation of said indoline compound to the corresponding indole compound, as illustrated by the following scheme:

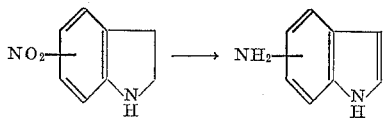

wherein, for purposes of illustration, the conversion of 4-(or 5-, or 6-, or 7-)nitroindoline to the corresponding aminoindole is shown.

It will be apparent to those skilled in the art that the starting indoline compound may be variously substituted without affecting the efficacy of the instant process, but that, depending on the nature of the substituent, the substituents may remain on the ring during the process of this invention or may be removed from the ring. Thus, substituent groups sensitive to molecular hydrogen under the reaction conditions employed will be removed or changed while substituents inert to molecular hydrogen will remain on the ring. This feature renders the instant process particularly valuable in that certain substituents not desired in the final aminoindole compound, but necessary to direct the positioning of the nitro group in making the starting materials utilizable in the invention, will be removed during the instant process while simultaneous hydrogenation of the nitro group and dehydrogenation of the indoline ring occur. For example, in order to prepare a 7-nitroindoline starting material, the following series of synthetic steps is necessary when employing indole as the ultimate starting material.

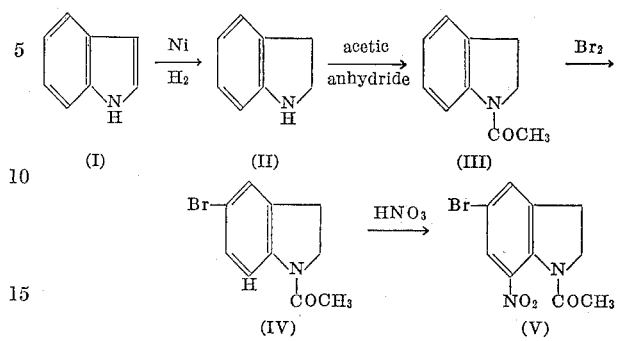

The starting indole (I) cannot be nitrated or halogenated directly because of the relatively unstable nature of the indole ring but rather must be converted to the corresponding indoline compound (II) which, in turn, must be acylated at the N-position as in compound (III) in order to direct positioning of the halogen on the indoline ring. The bromine substituent of compound (IV) directs subsequent nitration to the 7-position, as shown for compound (V). To prepare a corresponding 4-nitroindoline, compound (IV) is further brominated to give N-acetyl-5,7-dibromoindoline, which, in turn, is nitrated to introduce nitro groups at the 4- or 6-positions.

By the process of the instant invention, a starting material such as compound (V), 5-bromo-7-nitro-N-acetylindoline, is converted to the desired aminoindole as follows:

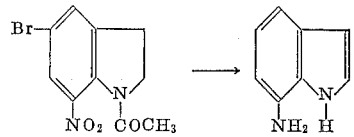

Thus it can be seen that four operations are simultaneously performed in the one-step process of this invention.

(1) Dehydrogenation of the indoline compound to the indole compound
(2) Hydrogenation of the 7-nitro substituent to the 7-amino substituent
(3) Removal of the N-acetyl group
(4) Removal of the 5-bromo substituent In similar fashion, other substituents sensitive to molecular hydrogen will be removed or altered during the process of this invention. For example, mercapto groups or groups containing olefinic unsaturation are susceptible to attack and groups such as esters, nitriles, amides, and the like are also subject to deterioration when an alkaline reaction medium is employed in the process of this invention.

However, certain substituents present on the starting material nitroindoline compound are not so susceptible to removal or alteration and are advantageously retained on the indole structure to provide biologically useful compounds. For example, the starting nitroindoline compounds can be optionally substituted at any of the available ring positions with such groups as alkyl, alkanoic acid, and the like, and be converted to the corresponding indole compounds by the instant process. For example, when employing starting materials such as 4-(or 5-, or 6-, or 7-)nitroindoline-3-alkanoic acid, the corresponding aminoindole-3-alkanoic acid is produced by the present process.

Thus, while a variety of starting materials can be employed in this invention, the present process is particularly applicable to the preparation of indole compounds carrying one or more amino groups at the ring positions of the benzenoid moiety, said compounds being free of other substituents susceptible to attack by molecular hydrogen in a non-acidic reaction medium.

As specifically exemplary of suitable starting materials, there can be mentioned 4-nitroindoline, 5-nitroindoline, 6-nitroindoline, 7 - nitroindoline, N - acetyl - 5 - nitroindoline, N - acetyl - 6 - nitroindoline, N - acetyl - 7 - nitroindoline, N - propionyl - 5 - nitroindoline, and analogous N-acyl-4-(or 5-, or 6-, or 7-)nitroindolines; 5-nitroindoline-3-acetic acid, 6-nitroindoline-3-acetic acid, 7-nitroindoline-3-acetic acid, 4-(or 5-, or 6-, or 7-)nitroindoline-3-propionic acid an analogous 4-(or 5-, or 6-, or 7-)nitroindoline-3-alkanoic acids having up to about 10 carbon atoms in the alkanoic acid moiety; N-acyl-4-(or 5-, or 6-, or 7-)nitroindoline-3-alkanoic acids such as, for example, N - acetyl - 5 - nitroindoline - 3 - acetic acid, N - propionyl - 7 - nitroindoline - 3 - butyric acid, and the like and, similarly, N-alkyl-4-(or 5-, or 6-, or 7-)nitroindoline-3-alkanoic acids such as N-methyl(or ethyl, propyl, butyl, etc.)-5-nitroindoline-3-acetic acid. The remaining ring positions of the indole structure including the 2 position can be substituted with substituents not susceptible to attack by molecular hydrogen in alkaline medium, e.g. with hydrocarbyl free of ethylenic or acetylenic unsaturation, for example alkyl and aryl of from 1 to about 10 carbon atoms, and carboxyl.

The process of this invention can be carried out at temperatures of from about 10° C. to about 180° C. and is preferably conducted at from 90° C. to 110° C. Temperatures in excess of 180° C. are to be avoided because of deleterious side reactions while use of temperatures below 10° C. results in too slow a reaction rate. Generally, the process is optimally carried out at atmospheric pressure although superatmospheric pressure up to 4 atmospheres or subatmospheric conditions, not below 100 mm. Hg, can be utilized.

The catalysts used in this invention comprise nickel-containing metal catalysts such as inert supported nickel, Raney nickel, and nickel alloys such as nickel-aluminum alloy.

It will be understood that when inert nickel metal is used as the catalyst, molecular hydrogen must be supplied externally whereas use of Raney nickel or nickel-aluminum alloy permits carrying out the instant process without such external hydrogen supply. In the case of Raney nickel the hydrogen adsorbed on the catalyst is utilized and in the case of nickel-aluminum alloy used in basic medium, the required hydrogen is generated by reaction with base of the aluminum in the alloy.

When using inert nickel metal, external hydrogen supply can be effected, for example, by bubbling hydrogen from a hydrogen generator into a solution of starting nitroindoline compound. The amount of nickel metal catalyst required to exert catalytically significant effects can range from about 5 to 50 percent by weight, based on nitroindoline starting material.

When Raney nickel is employed as the catalyst, no external hydrogen supply is required if the amount of catalyst used is sufficient to provide the hydrogen necessary for hydrogenation of the nitro group of the starting material. I have found that amounts of Raney nickel ranging from 100 to 400 percent by weight, based on nitroindoline starting material, are outstandingly effective in providing catalytic effects, the amount optimally being such as to supply all of the required hydrogen. In a particularly preferred aspect of my invention nickel-aluminum alloy is used in basic medium in amount sufficient to form the required hydrogen, it being understood that two aluminum atoms react to give three molecules of hydrogen. The use of nickel-aluminum alloy as the catalyst in the process of any invention is particularly efficacious in that nickel metal catalyst is released as the aluminum in the alloy reacts to form the required hydrogen.

It is important in the present process to maintain a neutral or, preferably, an alkaline reaction medium inasmuch as the compounds formed by our process are susceptible to destruction by acid and also in that the nickel-containing catalyst is rendered ineffective. I have found that the instant process is satisfactorily conducted in a pH range of from 7.0 to about 14, such pH being conveniently achieved by adding a strong base, such as .01 M to 10 M sodium hydroxide or potassium hydroxide to an aqueous reaction medium in an amount sufficient to give the desired pH.

The aminoindole compounds formed in the reaction precipitate upon cooling of the reaction mixture or neutralization in case of acids and are purified by conventional techniques, e.g. by recrystallization from water or isopropyl ether or other suitable organic solvents.

The following examples are illustrative.

EXAMPLE I

5-aminoindole-3-acetic acid

To a solution of 93 grams (0.353 mole) of 5-nitro-N-acetylindoline-3-acetic acid in 1160 milliliters of water containing 75 grams of sodium hydroxide was added, in portions, 350 grams of Raney nickel keeping the temperature at about 20° C. The mixture was heated slowly to boiling and refluxed for a total of 16 hours. After removal of the catalyst, 117 milliliters of acetic acid was added (pH 5.5) and the precipitated product collected. The filter cake was washed well with water, ethanol, and ether and dried to give 69 grams (93 percent as the monohydrate) of light-grey flakes, melting point 242–244° C., with decomposition. A sample was purified by dissolving in sodium hydroxide solution, filtering to remove any insoluble impurities, and reprecipitating to yield light-grey micro crystals, having a melting point of 242–243° C., with decomposition, and the following analysis:

|  | Percent C | Percent H | Percent N |
| --- | --- | --- | --- |
| Calculated for $C_{10}H_{10}N_2O_2 \cdot H_2O$ | 57.68 | 5.61 | 13.46 |
| Found | 57.82 | 5.67 | 13.22 |

EXAMPLE II

5-aminoindole-3-propionic acid

To a solution of 52 grams of N-acetyl-5-nitroindoline-3-propionic acid in 500 milliliters of water containing 40.7 grams of sodium hydroxide was added 150 grams of wet Raney nickel in portions, keeping the temperature at about 20° C. The mixture was then refluxed for a total of 19 hours, cooled, filtered and adjusted to neutral pH with 64 milliliters of acetic acid. The precipitated product was collected to give 33 grams (85 percent) of light-grey solids, melting point 204–212° C. An analytical sample, melting point 207–209° C., was prepared by reprecipitation from an alkaline solution and was obtained as the hemihydrate.

|  | Percent C | Percent H | Percent N |
| --- | --- | --- | --- |
| Calculated for $C_{11}H_{12}N_2O_2 \cdot 1/2H_2O$ | 61.96 | 6.5 | 13.14 |
| Found | 62.16 | 6.21 | 13.41 |

EXAMPLE III

5-aminoindole

A mixture of 5 grams of 5-nitro-N-acetylindoline, 50 milliliters of water containing 5 grams sodium hydroxide and 20 grams of wet Raney nickel catalyst was refluxed a total of 4 hours and then filtered while still hot. Upon cooling the filtrate 1.7 grams (53 percent) of nearly colorless short needles precipitated, melting point 129–130° C. A sample was crystallized from water for analysis and was obtained as short tan needles, melting point 130–131.5° C.

|  | Percent C | Percent H | Percent N |
|---|---|---|---|
| Calculated for $C_8H_8N_2$ | 72.70 | 6.10 | 21.20 |
| Found | 73.05 | 6.20 | 21.13 |

EXAMPLE IV

6-aminoindole

A mixture of 5 grams of 6-nitroindoline, 75 milliliters of water and 20 grams of nickel-aluminum alloy was heated to reflux and a solution of 30 grams of sodium hydroxide in 100 milliliters of water slowly added. After stirring an additional 30 minutes the mixture was filtered while hot to remove the nickel. Upon cooling the filtrate 1.7 grams (43 percent) of product precipitated and was obtained as colorless needles melting point 63–65° C.

EXAMPLE V

7-aminoindole

A mixture of 8 grams of N-acetyl-5-bromo-7-nitroindoline, 75 milliliters of water and 20 grams of nickel-aluminum alloy was treated as described in Example IV with 100 milliliters of water containing 40 grams of sodium hydroxide, to give 1.8 grams (49 percent) of product melting point 95–97° C. An analytical sample, melting point 99–101° C., was obtained as light-grey prisms after crystallization from isopropyl ether.

|  | Percent C | Percent H | Percent N |
|---|---|---|---|
| Calculated for $C_8H_8N_2$ | 72.70 | 6.10 | 21.20 |
| Found | 72.65 | 6.38 | 21.26 |

In the course of the explorations concerning the process of this invention, there were obtained novel compositions of matter exhibiting varied biological activity. In general, these compounds are characterized as 5-aminoindole-3-alkanoic acids having from 2 to about 10 carbon atoms in the alkanoic acid moiety and thus respond to the formula

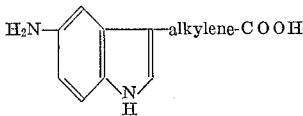

wherein the alkylene linkage can contain from one to about nine carbon atoms and may be straight chain or branched chain, and preferably contains from 1 to 6 carbon atoms.

As illustrative, the following can be mentioned:

5-aminoindole-3-acetic acid,
5-aminoindole-3-propionic acid,
5-aminoindole-3-butyric acid,
5-aminoindole-3-pentanoic acid,
5-aminoindole-3-hexanoic acid,
5-aminoindole-3-decanoic acid, and the like.

As representative of these novel 5-aminoindole-3-alkanoic acid compounds, 5-aminoindole-3-acetic acid and 5-aminoindole-3-propionic acid were tested for activity as insecticides and fungicides. Each compound was formulated by dissolving one gram of compound in 50 milliliters of acetone in which had been dissolved 0.1 gram (10 percent of the weight of compound) of "Triton X-155," an alkylphenoxy polyethoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water.

The tests employed were as follows:

ARMYWORM TEST

Larvae of the southern armyworm (*Prodenis eridania*, Cram.), reared on Tendergreen bean plants at a temperature of 80±5° F. and a relative humidity of 50±5 percent, constituted the test insects. The test larvae were removed from the colony and held without food for four hours prior to the test. The test compound was formulated by diluting the stock suspension with water to give a suspension containing 1000 parts of test compound per million parts of final formulation (by weight). Paired seed leaves, excised from Tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with filter paper. Four randomly selected larvae were introduced into each dish and the dishes were closed. The closed dishes were labeled and held at 80–85° F. for three days. Although the larvae could easily consume the whole leaf within twenty-four hours, no more food was added. Larvae which were unable to move the length of the body, even upon stimulation by prodding, were considered dead. Each compound was rated according to the percent kill achieved. Application of 5-aminoindole-3-acetic acid resulted in 80 to 100 percent kill of the larvae.

FUNGICIDE TEST

Spores of the bean rust organism (*Uromyces phaseoli*) harvested from a stock culture were mixed with talc in a weight ratio of 0.1 gram of spores per gram of talc. Potted Pinto bean plants with fully expanded primary leaves were inoculated with a spore suspension containing 0.1 gram of the spore/talc mixture in 100 milliliters of distilled water by spraying the potted plants, while revolving on a turntable, for 30 seconds with a DeVilbiss spray gun set at 20 p.s.i.g. The thus-inoculated plants were incubated for 24 hours at 60° F. and 100 percent relative humidity. The test compound was formulated by diluting the above-described stock suspension with water to give a formulation containing 250 parts of compound per million parts of formulation. The above-described inoculated plants were excised, placed in Erlenmeyer flasks, and covered with test formulation. The formulation containing the excised plants was held for 24 hours at 60±5° F. and 50±5 percent relative humidity under fluorescent light. The treated excised plants were then transferred to a nutrient solution and held under the same conditions for an additional six days. The degree of infection on primary leaves was visually rated. Application of the test compound resulted in only 4 to 10 spots per leaf, as compared to many spots on a control plant.

What is claimed is:

1. Process for preparing aminoindole compound having the amino group at one of the ring positions of the benzenoid moiety, and where the remaining ring positions of the indole structure are substituted with a member selected from the group consisting of hydrogen, carboxyl, and alkyl of up to and including 10 carbon atoms which process comprises reacting, at a temperature of from 10 to 180° C., a corresponding nitroindoline compound with molecular hydrogen in non-acidic aqueous medium in the contacting presence of a nickel-containing metal catalyst selected from the group consisting of elemental nickel, Raney nickel and nickel aluminum alloy, such catalyst being present in catalytically significant amounts from about 5 to about 400 percent by weight based on nitroindoline starting material.

2. Process for preparing aminoindole compound having the amino group at one of the ring positions of the benzenoid moiety, and where the remaining ring positions of the indole structure are substituted with a member selected from the group consisting of hydrogen, carboxyl, and alkyl of up to and including 10 carbon atoms which process comprises reacting, at a temperature of from 10 to 180° C., a corresponding nitroindoline compound with Raney nickel.

3. Process for preparing aminoindole compound having the amino group at one of the ring positions of the benzenoid moiety, and where the remaining ring positions of the indole structure are substituted with a member selected from the group consisting of hydrogen, carboxyl, and alkyl of up to and including 10 carbon atoms which process comprises reacting, at a temperature of from 10 to 180° C., a corresponding nitroindoline compound, in basic aqueous medium, with nickel-aluminum alloy.

4. The process of claim 2 where said Raney nickel is present in amount sufficient to supply the hydrogen required for hydrogenation of the nitro group of said nitroindoline compound.

5. Process for preparing 5-aminoindole-3-alkanoic acid compound having from 2 to 10 carbon atoms in the alkanoic acid moiety which comprises reacting, at a temperature of from 10 to 180° C., a corresponding 5-nitroindoline-3-alkanoic acid compound with molecular hydrogen in non-acidic aqueous medium in the contacting presence of a nickel-containing metal catalyst selected from the group consisting of elemental nickel, Raney nickel and nickel aluminum alloy, such catalyst being present in catalytically significant amounts from about 5 to about 400 percent by weight based on nitroindoline starting material.

6. Process for preparing aminoindole compound having the amino group at one of the ring positions of the benzenoid moiety of said compound, which process comprises reacting, at a temperature of from 10 to 180° C., the corresponding nitroindoline compound having a carboxylic acyl group on the indoline nitrogen atom where the acyl moiety contains from 2 to 3 carbon atoms with molecular hydrogen in non-acidic aqueous medium in the contacting presence of a nickel-containing metal catalyst selected from the group consisting of elemental nickel, Raney nickel and nickel aluminum alloy, such catalyst being present in catalytically significant amounts from about 5 to about 400 percent by weight based on nitroindoline starting material.

7. Process for preparing 5-aminoindole-3-acetic acid which comprises reacting, at a temperature of from 10 to 180° C., 5-nitro-N-acetylindoline-3-acetic acid with Raney nickel in basic aqueous medium.

8. Process for preparing 5-aminoindole-3-propionic acid which comprises reacting, at a temperature of from 10 to 180° C., 5-nitro-N-acetylinodoline-3-propionic acid with Raney nickel in basic aqueous medium.

References Cited by the Examiner

Brown et al.: J. American Chemical Society, vol. 77, pp. 3839–3842 (1955).

Chemical Abstracts, vol. 52, page 11003 (1958).

Cram et al.: Organic Chemistry, McGraw-Hill Book Co., Inc., New York, 1959, page 427.

De Graw et al.: J. Org. Chemistry, vol. 27 pages 1728–1730 (1962).

Sumpter et al.: The Chemistry of Heterocyclic Compounds With Indole and Carbozole Systems, pages 38–39 (1954).

Thesing et al.: Chem. Ber., vol. 95, Sept. 1962, pp. 2205–2211.

Vejdelek: Chem. Listy, vol. 51, No. 7, pp. 1338–1343 (1957).

NICHOLAS S. RIZZO, *Primary Examiner.*

WALTER A. MODANCE, *Examiner.*